Patented July 7, 1936

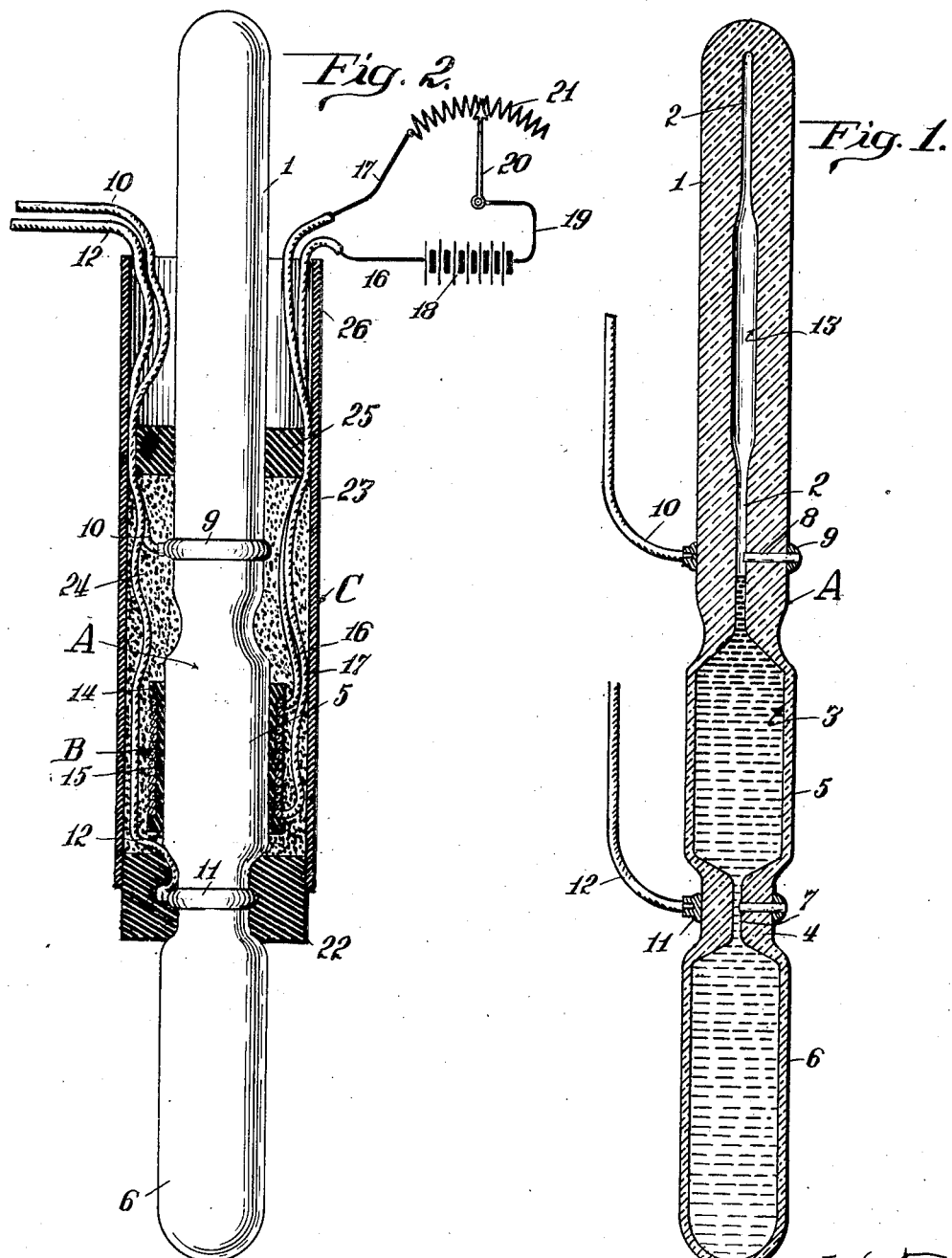

2,046,578

UNITED STATES PATENT OFFICE 2,046,578

THERMOSTAT

Paul B. Parks, Oak Park, and Donald W. Miller, Elmhurst, Ill., assignors to Vapor Car Heating Company, Inc., Chicago, Ill., a corporation of New York Application May 3, 1935, Serial No. 19,568

14 Claims. (Cl. 200—122)

This invention relates to certain new and useful improvements in thermostats of the mercury column type, more particularly to an improved means for changing or adjusting the temperature or temperatures at which the thermostat will function.

The well-known mercury column thermostat resembles an ordinary mercury thermometer with electric contacts so positioned in the path of the mercury column that a circuit through a portion of this mercury column will be completed or broken as the temperature reaches or falls below a certain predetermined temperature at which the device is designed to function. In order to change or adjust the temperature at which the thermostat will function it has been proposed to add or subtract heat from the vicinity of the thermostat bulb, that is, apply a substantially constant correction. This idea is disclosed and claimed in the patent to Parks 1,760,081, granted May 27, 1930. The accuracy of this method of adjustment is affected by changes in the air currents flowing in the vicinity of the thermostat bulb and the heating or cooling means. The effect of the heater will be dissipated or reduced to some extent by a strong air current tending to carry away the heated air before it can transfer heat to the thermostat, also a certain portion of the heat from this heating element will be lost through conduction or radiation and this impairs the accuracy or constancy of the heat correction applied.

According to the present invention the mercury reservoir of the thermometer is divided between two connected bulbs, one of these bulbs (preferably the lower bulb) being exposed to the atmosphere and functioning in the usual manner in response to changes in atmospheric temperature. A heating element, preferably an electric heating coil, is fitted closely about the upper bulb, and this heating element (and also preferably the electric contact devices) are enclosed in a covering of insulating material so as to effectively insulate this portion of the apparatus against atmospheric disturbances of all kinds, such as air currents or atmospheric temperature changes. This insulating covering assists in insulating the electrical portions of the apparatus, as well as minimizing the heat losses from the electric heater.

The principal object of this invention is to provide an improved thermostat such as briefly described hereinabove and disclosed more in detail in the specifications which follow.

Another object is to provide an improved form of thermometer for use in this thermostatic assembly.

Another object is to provide improved means for applying a temperature correction to this thermometer.

Another object is to provide an improved insulating housing and protecting means for a portion of the thermostat.

Other objects and advantages of this invention will be more apparent from the following detailed description of one approved form of thermostat constructed and operating according to the principles of this invention.

In the accompanying drawing:

Fig. 1 is a central vertical section through the improved thermostat before the heating and insulating elements have been applied.

Fig. 2 illustrates the more complete assembly, the thermometer being shown in elevation and the heating and insulatng covering in central vertical section.

This thermostatic assembly comprises in general the thermometer A, the heating element B, and the insulating and protecting housing C.

The thermometer A is in the form of a closed glass tube comprising an upper stem portion 1 formed with a small central capillary passage 2, and the lower reservoir portion 3 with which passage 2 communicates. The reservoir portion 3 is divided by an intermediate restricted portion 4 into the upper and lower bulbs 5 and 6 respectively. A small central passage 7 in the restricted portion 4 connects the two bulbs 5 and 6. The bulbs 5 and 6 are filled with mercury which at ordinary temperatures extends up a short distance into the capillary passage 2 in stem 1.

The upper electric contact device comprises a metallic (for example platinum) wire 8 which is sealed into the stem 1 so as to make electric contact with the mercury column in capillary passage 2 when a certain maximum temperature is reached. The position of this contact in the stem 1 will be determined by the temperature at which the thermostat is intended to function. The outer end of wire 8 is connected with the conducting ring 9 which is fitted about the stem, and the insulated circuit wire 10 leads from the ring 9. The lower contact device indicated generally at 11, from which the circuit wire 12 leads, may be similar in all respects to the upper contact device previously described. This lower contact 11 may be located in any portion of the tube so that it will normally be in engagement with the mercury. For example it might be positioned about the lower portion of stem 1 below the contact 8. However, it is preferable to position this lower contact about the restricted portion 4 between the bulbs 5 and 6 so that it will make contact with the mercury in the intermediate passage 7. When the temperature rises to the certain predetermined maximum, an electric circuit will be completed between wires 10 and 12 through the mercury. When the temperature falls below this predetermined maximum, the mercury column will fall out of contact with upper contact 8 and the circuit will be broken.

Preferably the capillary passage 2 in stem 1 will be enlarged as shown at 13, at a location above the upper contact 8 so that the thermostat may be safely exposed to rather high temperatures without unduly lengthening the tube.

Referring now to Fig. 2, the heating element B comprises a rather thin spool 14 of rubber or other suitable insulating material which is fitted closely about one of the bulbs, preferably the upper bulb 5. On this spool is wound a coil of resistance wire 15, the circuit wires 16 and 17 leading from the opposite end portions of this coil. By suitably adjusting the amount of current passed through this circuit, the heat delivered from coil 15 may be varied so as to determine the temperature adjustment or correction that is applied to the thermostat. As here shown by way of example the wire 16 leads from one side of a source of power 18 connected at its other terminal by wire 19 to the movable arm 20 of a rheostat. The other wire 17 leading from heating coil 15 is connected to one terminal of the resistance coil 21 of the rheostat. By selectively positioning the rheostat arm 20 the current flowing in heating coil 15 can be adjusted to secure the desired heat correction.

The insulating covering C comprises a ring or bushing 22 of rubber or other yieldable insulating material which is fitted about the lower contact device 11 and the restricted portion 4 of the tube. This bushing 22 is of somewhat greater diameter than the heating element B, and the hollow cylindrical sleeve 23 of suitable insulating material is fitted at its lower open end about the bushing 22 so as to form a housing closed at its lower end but open at its upper end. This housing is filled to a point somewhat above the upper contact device 8 with suitable insulating material 24, preferably a powdered insulation such as clay or cement that can be poured into the upper end of tube 23. The housing is then closed by an upper annular plug 25 of suitable insulating material. The circuit wires 10, 12, 16 and 17 may conveniently be directed upwardly through the insulating filling 24 and around the plug 25 and out through the upper end of tube 23. Preferably the tube or sleeve 23 is continued upwardly beyond the plug 25 as shown at 26 so as to extend about the lower portion of a member by which the assembly is supported, this member being secured about the upper portion of the thermometer stem.

In operation, it will be understood that the lower bulb 6 is entirely exposed to the atmosphere so as to be responsive to atmospheric temperature changes as is usual in thermometers or thermostats of this type. When the temperature rises the mercury in bulb 6 will expand so that some of the mercury will move upwardly through passage 7 thus displacing mercury in bulb 5 and raising the mercury column in the capillary passage 2 of stem 1. When a certain predetermined temperature is reached the mercury column will engage the upper contact 8 and complete the operating circuit between wires 10 and 12. This circuit is adapted (through intermediate mechanism as is well known in this art) to control a temperature regulating system so that the supply of heating medium will be shut off or diminished, or the supply of cooling medium will be turned on or increased when the predetermined maximum temperature is reached in the space wherein the thermostat is located. Let us assume, by way of example, that the thermostat is constructed so as to normally function at 74° Fahrenheit. In other words, if the atmospheric temperatures rises to 74° Fahrenheit the mercury column will rise sufficiently to engage the fixed contact 8 and complete the circuit. Now if it is desired to complete this circuit at some lower temperature, for example 72° Fahrenheit, it is ordinarily necessary to provide another similar thermostat with the fixed contact 8 positioned at a different level, or constructed with a change in the volume of mercury or some other feature of design in the instrument. According to the present invention, the rheostat 20 will be so adjusted that the current flowing through heating element B will be just sufficient to raise the temperature of the mercury in bulb 5 so as to raise the mercury column through a distance corresponding to 2° Fahrenheit. Therefore, if the atmospheric temperature reaches 72° Fahrenheit, the mercury column would actually be elevated two more degrees as the result of the correction applied to the upper bulb 5 and the instrument would function as before, that is contact would be made between the mercury column and fixed contact 8 although the actual atmospheric temperature is only 72° Fahrenheit.

A single instrument of this type can be so adjusted as to function at a variety of different selected temperatures, thereby performing the combined functions of a plurality of thermostats each designed to function at only a single predetermined temperature. Furthermore, if the thermostat is to function at only a single temperature, a permanent correction can be applied, if desirable or found necessary.

If desired, a plurality of spaced contacts, similar to the contact 8, could be positioned in the stem 1 so that different circuits will be successively completed as the temperature rises. In such a construction the correction applied by the heating element B will be applied to each of these circuits.

Other types of heating or cooling elements B could be substituted if desired and enclosed by the insulating housing C.

It will be noted that the temperature correcting element B is completely enclosed and protected and is insulated against heat losses and will not be appreciably influenced by varying air currents or other disturbing influences in the surrounding atmosphere. In other words, the temperature correction can be maintained substantially constant.

This temperature correcting assembly could be applied to either of the bulbs 5 or 6, but is preferably applied to the upper bulb 5, since the lower bulb 6 can be more completely exposed to the atmosphere and thus be more sensitive to atmospheric temperature changes. Furthermore, by applying the heating element B to the upper bulb 5 the protecting and insulating assembly C can be used to cover not only the heating element but the electric contact devices, as in the example here shown.

We claim:

1. A mercury column thermostat consisting of a closed thermometer tube comprising an upper stem portion having a capillary passage therein, and a lower reservoir portion with which the capillary passage communicates, the reservoir portion being restricted intermediate its length to form two separate but communicating bulbs, a quantity of mercury filling the bulbs, a pair of electric contacts sealed into the tube at spaced points so as to make contact with the mercury, one of these contacts being positioned in the stem so that the mercury column will contact therewith at a certain predetermined maximum temperature, the other contact being positioned in a lower portion of the tube so as to be in constant contact with the mercury, a heating element closely surrounding one of the bulbs, and a covering of insulating material for this heating element, the other bulb being left uncovered so that the mercury therein will respond to temperature changes in the air to which this bulb is exposed.

2. A mercury column thermostat consisting of a closed thermometer tube comprising an upper stem portion having a capillary passage therein, and a lower reservoir portion with which the capillary passage communicates, the reservoir portion being restricted intermediate its length to form two separate but communicating bulbs, a quantity of mercury filling the bulbs, a pair of electric contacts sealed into the tube at spaced points so as to make contact with the mercury, one of these contacts being positioned in the stem so that the mercury column will contact therewith at a certain predetermined maximum temperature, the other contact being positioned in a lower portion of the tube so as to be in constant contact with the mercury, a heating element closely surrounding the upper bulb, and a covering of insulating material for this heating element, the lower bulb being left uncovered so that the mercury therein will respond to temperature changes in the air to which this bulb is exposed.

3. A mercury column thermostat consisting of a closed thermometer tube comprising an upper stem portion having a capillary passage therein, and a lower reservoir portion with which the capillary passage communicates, the reservoir portion being restricted intermediate its length to form two separate but communicating bulbs, a quantity of mercury filling the bulbs, a pair of electric contacts sealed into the tube at spaced points so as to make contact with the mercury, one of these contacts being positioned in the stem so that the mercury column will contact therewith at a certain predetermined maximum temperature, the other contact being positioned in the restricted portion of the tube between the bulbs so as to be in constant contact with the mercury, a heating element closely surrounding the upper bulb, and a covering of insulating material for this heating element, the lower bulb being left uncovered so that the mercury therein will respond to temperature changes in the air to which this bulb is exposed.

4. A mercury column thermostat consisting of a closed thermometer tube comprising an upper stem portion having a capillary passage therein, and a lower reservoir portion with which the capillary passage communicates, the reservoir portion being restricted intermediate its length to form two separate but communicating bulbs, a quantity of mercury filling the bulbs, a pair of electric contacts sealed into the tube at spaced points so as to make contact with the mercury, one of these contacts being positioned in the stem so that the mercury column will contact therewith at a certain predetermined maximum temperature, the other contact being positioned in a lower portion of the tube so as to be in constant contact with the mercury, the capillary passage in the stem being enlarged at a location above the upper contact so as to increase the temperature range to which the thermostat may be safely subjected, a heating element closely surrounding one of the bulbs, and a covering of insulating material for this heating element, the other bulb being left uncovered so that the mercury therein will respond to temperature changes in the air to which this bulb is exposed.

5. A mercury column thermostat consisting of a closed thermometer tube comprising an upper stem portion having a capillary passage therein, and a lower reservoir portion with which the capillary passage communicates, the reservoir portion being restricted intermediate its length to form two separate but communicating bulbs, a quantity of mercury filling the bulbs, a pair of electric contacts sealed into the tube at spaced points so as to make contact with the mercury, one of these contacts being positioned in the stem so that the mercury column will contact therewith at a certain predetermined maximum temperature, the other contact being positioned in the restricted portion of the tube between the bulbs so as to be in constant contact with the mercury, the capillary passage in the stem being enlarged at a location above the upper contact so as to increase the temperature range to which the thermostat may be safely subjected, a heating element closely surrounding the upper bulb, and a covering of insulating material for this heating element, the lower bulb being left uncovered so that the mercury therein will respond to temperature changes in the air to which this bulb is exposed.

6. A mercury column thermostat consisting of a closed thermometer tube comprising an upper stem portion and a lower reservoir portion, the reservoir portion being divided by a restricted portion intermediate its length so as to form two separate but communicating bulbs, a quantity of mercury filling the bulbs, a pair of electric contacts sealed into the tube, one of these contacts being positioned in the stem so that the mercury column in the stem will contact therewith at a predetermined maximum temperature, the other contact being positioned in a lower portion of the tube so as to be in constant contact with the mercury, an electric heating coil fitted about the upper bulb, circuit wires leading from the contacts and the ends of the heating coil, and a covering of heat insulating material secured about the coil, the lower bulb being left uncovered so that the mercury therein will respond to temperature changes in the air to which this bulb is exposed.

7. A mercury column thermostat consisting of a closed thermometer tube comprising an upper stem portion and a lower reservoir portion, the reservoir portion being divided by a restricted portion intermediate its length so as to form two separate but communicating bulbs, a quantity of mercury filling the bulbs, a pair of electric contacts sealed into the tube, one of these contacts being positioned in the stem so that the mercury column in the stem will contact therewith at a predetermined maximum temperature, the other contact being positioned in a lower portion of the tube so as to be in constant contact with the mercury, an electric heating coil fitted about the upper bulb, circuit wires leading from the contacts and the ends of the heating coil, and a covering of heat insulating material secured about the coil and the electric contacts, the lower bulb being left uncovered so that the mercury therein will respond to temperature changes in the air to which this bulb is exposed.

8. A mercury column thermostat consisting of a closed thermometer tube comprising an upper stem portion and a lower reservoir portion, the reservoir portion being divided by a restricted portion intermediate its length so as to form two separate but communicating bulbs, a quantity of mercury filling the bulbs, a pair of electric contacts sealed into the tube, one of these contacts being positioned in the stem so that the mercury column in the stem will contact therewith at a predetermined maximum temperature, the other contact being positioned in the restricted portion of the tube between the bulbs, an electric heating coil fitted about the upper bulb, circuit wires leading from the contacts and the ends of the heating coil, and a covering of heat insulating material secured about the coil, the lower bulb being left uncovered so that the mercury therein will respond to temperature changes in the air to which this bulb is exposed.

9. A mercury column thermostat consisting of a closed thermometer tube comprising an upper stem portion and a lower reservoir portion, the reservoir portion being divided by a restricted portion intermediate its length so as to form two separate but communicating bulbs, a quantity of mercury filling the bulbs, a pair of electric contacts sealed into the tube, one of these contacts being positioned in the stem so that the mercury column in the stem will contact therewith at a predetermined maximum temperature, the other contact being positioned in the restricted portion of the tube between the bulbs, an electric heating coil fitted about the upper bulb, circuit wires leading from the contacts and the ends of the heating coil, and a covering of heat insulating material secured about the coil and the electric contacts, the lower bulb being left uncovered so that the mercury therein will respond to temperature changes in the air to which this bulb is exposed.

10. A mercury column thermostat consisting of a closed thermometer tube comprising an upper stem portion and a lower reservoir portion, the reservoir portion being divided by a restricted portion intermediate its length so as to form two separate but communicating bulbs, a quantity of mercury filling the bulbs, a pair of electric contacts sealed into the tube, one of these contacts being positioned in the stem so that the mercury column in the stem will contact therewith at a predetermined maximum temperature, the other contact being positioned in a lower portion of the tube so as to be in constant contact with the mercury, a thin spool of insulating material fitted about the upper bulb, an electric heating coil wound on the spool, circuit wires leading from the contacts and the ends of the heating coil, and a covering of insulating material secured about the coil, the lower bulb being left uncovered so that the mercury therein will respond to temperature changes in the air to which this bulb is exposed.

11. A mercury column thermostat consisting of a closed thermometer tube comprising an upper stem portion and a lower reservoir portion, the reservoir portion being divided by a restricted portion intermediate its length so as to form two separate but communicating bulbs, a quantity of mercury filling the bulbs, a pair of electric contacts sealed into the tube, one of these contacts being positioned in the stem so that the mercury column in the stem will contact therewith at a predetermined maximum temperature, the other contact being positioned in the restricted portion of the tube between the bulbs, a thin spool of insulating material fitted about the upper bulb, an electric heating coil wound on this spool, circuit wires leading from the contacts and the ends of the heating coil, and a covering of insulating material secured about the coil, the lower bulb being left uncovered so that the mercury therein will respond to temperature changes in the air to which this bulb is exposed.

12. A mercury column thermostat consisting of a closed thermometer tube comprising an upper stem portion and a lower reservoir portion, the reservoir portion being divided by a restricted portion intermediate its length so as to form two separate but communicating bulbs, a quantity of mercury filling the bulbs, a pair of electric contacts sealed into the tube, one of these contacts being positioned in the stem so that the mercury column in the stem will contact therewith at a predetermined maximum temperature, the other contact being positioned in the restricted portion of the tube between the bulbs, a thin spool of insulating material fitted about the upper bulb, an electric heating coil wound on this spool, circuit wires leading from the contacts and the ends of the heating coil, and a covering of insulating material secured about the coil and the electric contacts, the lower bulb being left uncovered so that the mercury therein will respond to temperature changes in the air to which this bulb is exposed.

13. A mercury column thermostat consisting of a closed thermometer tube comprising an upper stem portion and a lower reservoir portion, the reservoir portion being divided by a restricted portion intermediate its length so as to form two separate but communicating bulbs, a quantity of mercury filling the bulbs, a pair of electric contacts sealed into the tube, one of these contacts being positioned in the stem so that the mercury column in the stem will contact therewith at a predetermined maximum temperature, the other contact being positioned in the restricted portion of the tube between the bulbs, a thin spool of insulating material fitted about the upper bulb, an electric heating coil wound on this spool, a yieldable ring of insulating material of greater outer diameter than the spool positioned about the lower contact device, a hollow cylindrical sleeve fitted about the ring and projecting upwardly over the spool and upper contact, a filling of insulating material poured within the sleeve about the spool and the upper contact, a closure for the upper end of the sleeve, and circuit wires leading from the contacts and the ends of the coil, the lower bulb being left uncovered so that the mercury therein will respond to temperature changes in the air to which this bulb is exposed.

14. A mercury column thermostat consisting of a closed thermometer tube comprising an upper stem portion and a lower reservoir portion, the reservoir portion being divided by a restricted portion intermediate its length so as to form two separate but communicating bulbs, a quantity of mercury filling the bulbs, a pair of electric contacts sealed into the tube, one of these contacts being positioned in the stem so that the mercury column in the stem will contact therewith at a predetermined maximum temperature, the other contact being positioned in the restricted portion of the tube between the bulbs, a thin spool of insulating material fitted about the upper bulb, an electric heating coil wound on this spool, a yieldable ring of insulating material of greater outer diameter than the spool positioned about the lower contact device, a hollow cylindrical sleeve fitted about the ring and projecting upwardly over the spool and upper contact, a filling of insulating material poured within the sleeve about the spool and the upper contact, a closure for the upper end of the sleeve, and circuit wires leading from the contacts and the ends of the coil and extending through the insulating material and out through the upper end of the sleeve, the lower bulb being left uncovered so that the mercury therein will respond to temperature changes in the air to which this bulb is exposed.

PAUL B. PARKS.
DONALD W. MILLER.